United States Patent [19]
Margotte et al.

[11] 3,875,123
[45] Apr. 1, 1975

[54] POLYMERS AND COPOLYMERS BASED ON ALKENOYL-OXYBENZYLIDENE-MALONIC ESTERS AS UV-ABSORBERS AND PLASTICS STABILIZED THEREWITH

[75] Inventors: Dieter Margotte, Krefeld-Bockum; Burkhard Lachmann, Krefeld-Uerdingen; Hugo Vernaleken, Krefeld; Hans Rudolph, Krefeld; Wolfgang Cohnen, Krefeld, all of Germany

[73] Assignee: Bayer Aktiengesellschaft, Leverkusen, Germany

[22] Filed: June 22, 1973

[21] Appl. No.: 372,724

[30] Foreign Application Priority Data
June 28, 1972 Germany.............................. 2231531
June 28, 1972 Germany.............................. 2231532

[52] U.S. Cl....260/78.4 E, 260/47 UA, 260/78.5 UA
[51] Int. Cl...... C08f 3/70, C08f 15/00, C08g 33/10
[58] Field of Search...... 260/78.4 E, 47 UA, 47 CA, 260/78.5 B

[56] References Cited
UNITED STATES PATENTS
3,475,176 10/1969 Rauner.......................... 260/78.4 E

*Primary Examiner*—Joseph L. Schofer
*Assistant Examiner*—Marla S. Tungol
*Attorney, Agent, or Firm*—Lawrence S. Pope

[57] ABSTRACT

Homopolymers and copolymers based on alkenoyloxybenzylidenemalonic esters of the formula

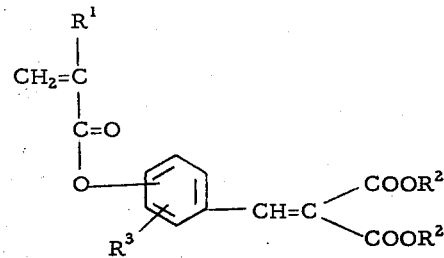

where
$R^1$ is hydrogen or $C_1$ to $C_4$-alkyl;
$R^2$ is $C_1$ to $C_{12}$-alkyl or cycloalkyl and
$R^3$ is hydrogen, $C_1$ to $C_8$-alkyl, $C_1$ to $C_8$-alkoxy or halogen, and plastics, i.e., polycarbonates, stabilized therewith.

14 Claims, No Drawings

POLYMERS AND COPOLYMERS BASED ON ALKENOYL-OXYBENZYLIDENE-MALONIC ESTERS AS UV-ABSORBERS AND PLASTICS STABILIZED THEREWITH

BACKGROUND OF THE INVENTION

The invention relates to new polymers based on alkenoyloxybenzylidenemalonic esters and their use as UV-absorbers for stabilizing plastics.

A large number of UV-absorbers is known (compare, for example, DT-OS 1,544,605 (corresponds to British 1,037,169) or DT-PS 1,087,902) but they possess a series of disadvantages. Thus, for example, yellowing and browning of UV-stabilized products is to be observed on continuous heat exposure. A further disadvantage of many previously known UV-absorbers is their volatility, which leads to considerable difficulties (loss by evaporation, loss by migration and the like), especially at higher processing temperatures.

Transparent polycarbonate molding compositions stabilized against UV-light which contain low molecular UV-absorbers are also known. The stabilization of polycarbonates, however, and especially pigmented polycarbonates, has not been satisfactory. The previously known and used UV-absorbers fail in the stabilization of polycarbonates in the presence of pigments. Evidently, interactions between polycarbonate, pigment surface and UV-light play a decisive role in this.

SUMMARY OF THE INVENTION

Polymeric UV-absorbers based on alkenoylbenzylidenemalonic esters are provided according to the invention which contain UV-light absorbing groups of the formula

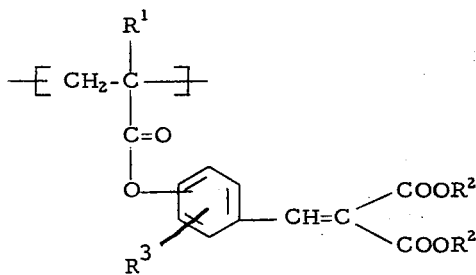

wherein
$R^1$ is hydrogen or alkyl with $C_1$ to $C_4$;
$R^2$ is alkyl with $C_1$ to $C_{12}$ or cycloalkyl such as cyclohexyl; and
$R^3$ is hydrogen, alkyl with $C_1$ to $C_8$, preferably with $C_1$ to $C_4$, alkoxy with $C_1$ to $C_8$, preferably methoxy or halogen, such as chlorine or bromine.

The polymeric UV-absorbers of the invention are resistant to sublimation and therefore also show no tendency to migrate out of the polymeric substrates which are to be stabilized. Furthermore, the browning on prolonged heat exposure, which is frequently observed on UV-stabilized products, is not observed with the polymers according to the invention.

Polycarbonate molding compositions stabilized according to the invention contain from 0.05 to 10 percent by weight, and preferably 0.1 to 2.5 percent by weight, based on the weight of the polycarbonate of the polymeric UV-absorbers. These compositions, which may contain pigments, are distinguished by excellent stability toward the harmful influence of UV-light.

DETAILED DESCRIPTION

The new polymers according to the invention are obtainable by homopolymerization of alkenoyloxybenzylidenemalonic esters or by copolymerization of these compounds with other ethylenically unsaturated monomers. As a result of the copolymerization of the said malonic ester derivatives, the polymers contain groups which absorb UV-light.

These groups which absorb UV-light can be illustrated, for example, by the following formula (I)

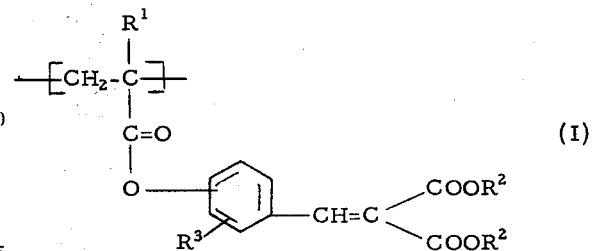

wherein
$R^1$ is hydrogen or alkyl with $C_1$ to $C_4$;
$R^2$ is alkyl with $C_1$ to $C_{12}$ or cycloalkyl, such as cyclohexyl; and
$R^3$ is hydrogen, alkyl with $C_1$ to $C_8$, preferably with $C_1$ to $C_4$, alkoxy with $C_1$ to $C_8$ preferably methoxy or halogen, such as chlorine or bromine.

The most preferred polymers of the general formula (I) are those in which $R^1$ is hydrogen or methyl; $R^2$ is methyl, ethyl or n-octyl and $R^3$ is hydrogen or methoxy.

The polymeric UV-absorbers according to the invention are manufactured, for example, by homopolymerization or copolymerization of from about 5 to 100 percent by weight of a UV-light absorbing monomer of the general formula (II)

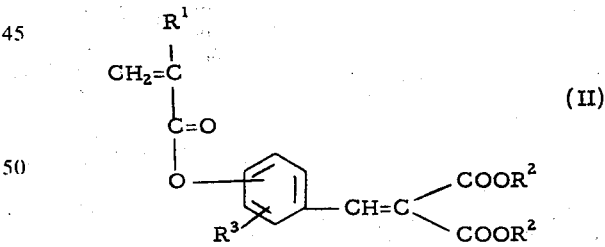

wherein
$R^1$ is hydrogen or alkyl with $C_1$ to $C_4$;
$R^2$ is alkyl with $C_1$ to $C_{12}$ or cycloalkyl, such as cyclohexyl; and
$R^3$ is hydrogen, alkyl with $C_1$ to $C_8$, alkoxy with $C_1$ to $C_8$ or halogen, such as chlorine or bromine,
with 95 to 0 percent by weight of one or more comonomers. The alkenoyloxybenzylidenemalonic bis-esters can be manufactured in accordance with well-known processes by reaction of malonic acid bis-esters with hydroxybenzaldehydes, in the presence of a base (see, for example, Org. Reactions, Vol. XV, 1967, page 332) to form hydroxybenzylidenemalonic acid diesters which are subsequently reacted with acrylic acid chloride or methacrylic acid chloride as described in the examples. Suitable malonic acid esters are, for example, malonic acid dicyclohexyl ester, malonic acid dimethyl ester, malonic acid diethyl ester, malonic acid dipropyl ester, malonic acid diisopropyl ester, malonic acid dibutyl ester, malonic acid pentyl ester, malonic acid dihexyl ester, malonic acid dioctyl ester, malonic acid dinonyl ester, malonic acid didecyl ester and malonic acid didodecyl ester. Examples of suitable alkenoyloxybenzylidenemalonic esters are compounds of the following formulae:

The homopolymers and copolymers according to the invention are manufactured in accordance with well-known processes, for example, by radical polymerization in inert solvents, such as benzene or chlorobenzene, at 60° to 80°C. Initiators used in this type of process are compounds customary for radical polymerizations, such as peroxides, azo compounds such as azodiisobutyric acid nitrile and the like.

The molecular weights of the homopolymers and copolymers according to the invention, which weights have no significant influence on the stabilizing action, lie between about 20,000 and 100,000, and preferably between 30,000 and 60,000.

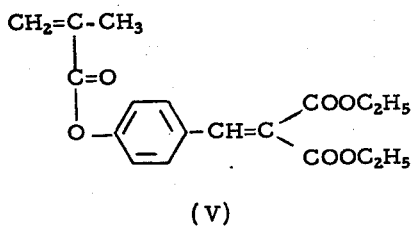

(V)

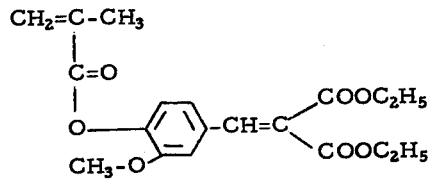

(VI)

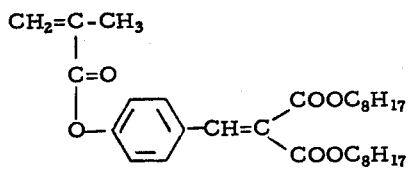

(VII)

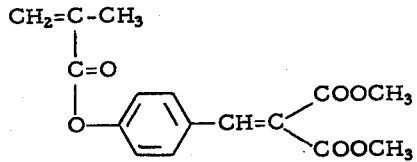

(VIII)

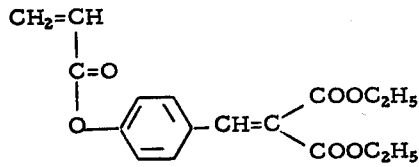

(IX)

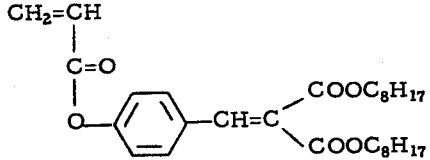

(X)

Comonomers suitable for the manufacture of the copolymers according to the invention are monoolefins, such as ethylene, propylene and isobutylene; vinyl esters, such as vinyl chloride, vinylidene chloride, vinyl acetate or vinyl propionate and vinyl benzoate; acrylic and methacrylic acid esters, amides and nitriles; allyl- and vinyl-methyl-, -ethyl- and -isobutyl-ether; vinyl-aromatics, such as styrene, α-methyl-styrene, vinyltoluene, p-ethyl-styrene, 2,4-dimethylstyrene, o-chlorostyrene and 2,5-dichlorostyrene.

Copolymers with vinyl monomers containing epoxide groups are particularly suitable for the manufacture of the copolymers, since in addition to stabilization against ultraviolet radiation a distinctly improved lightness of color and brilliance of color results, and the mechanical properties are simultaneously improved.

Suitable vinyl monomers containing epoxide groups are, for example: glycidyl esters of ethylenically unsaturated carboxylic acids (glycidyl methacrylate) and, especially, acrylyl- and methacrylyl-ethers, glycidyl-ethers of ethylenically unsaturated alcohols (allyl-glycidyl-ether) and of alkenyl-phenols (isopropenylphenyl-glycidyl-ether) as well as vinyl esters and allyl esters of epoxycarboxylic acids (vinyl ester of epoxidized oleic acid).

The manufacture of the UV-light absorbing monomers and the manufacture of the UV-light absorbing polymers of the invention are described in more detail in the examples.

A surprising characteristic of the invention resides in the fact that the coefficients of the extinction of the polymers according to the invention, taking the UV-absorbing component into account, are always distinctly above the coefficients of extinction of the corresponding monomer mixtures.

Thus it is found, for example (see Table I below) that copolymers of methyl methacrylate (MMA) with varying amounts of the UV-active compound of the formula (III)

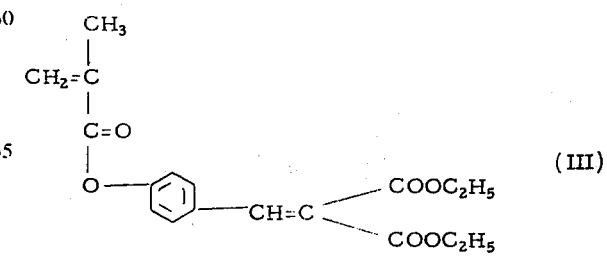

(III)

possess a distinctly higher coefficient of extinction in polycarbonate than is to be expected in comparison to the structure present in the polymer, which is characterized by the model compound of the formula (IV)

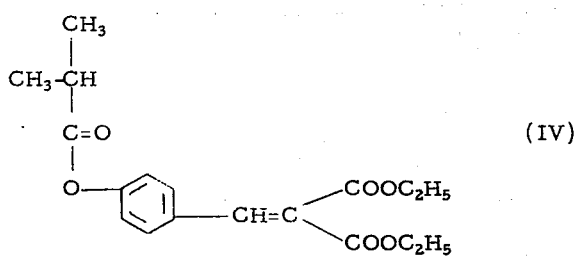

TABLE I

| Composition of the copolymers Percent by weight (III) | Percent by weight MMA | UV-active content of (III), (*) determined in the polycarbonate: Percent by weight |
|---|---|---|
| 5 | 95 | 11 |
| 10 | 90 | 17 |
| 50 | 50 | 60 |
| 100 | — | 109 |

(*) measured with UV-spectral-photometer EPS-3 T of firm Hitachi

On the other hand, on mixing (IV) into a polymethyl methacrylate, UV-analyses show, as expected, an extinction in polycarbonate corresponding to the proportion employed.

Thus a distinctly improved UV-absorption for the same content of UV-active substance is achieved by means of the polymers according to the invention.

A further advantage of the invention resides in the fact that through the choice of suitable comonomers for each case the compatibility of the UV-light-absorbing copolymers with the products (plastics) to be stabilized can be influenced and improved.

Polymers which may be stabilized with the aid of the new polymeric UV-absorbers are the industrially utilizable homopolymers and copolymers of, for example, styrene, acrylonitrile, methyl methacrylate, mixtures of styrene and ethylenically unsaturated polyesters, polyolefins, such as polyethylene, polypropylene or polyisobutylene, or polymers of the ABS type.

Polycondensates are also suitable for UV-stabilization with the polymers according to the invention. These polycondensates include, for example, unsaturated polyesters based on $\alpha,\beta$-ethylenically unsaturated dicarboxylic acids and polyols, especially glycols, e.g., polyesters of maleic anhydride and propylene glycol; saturated polyesters based on adipic acid, terephthalic acid, ethylene glycol, 1,6-hexanediol or 1,2-propanediol; polyamides based on $\epsilon$-caprolactam or the condensation of hexamethylene-diamine and adipic acid. Polyurethanes of diisocyanates, such as, for example, toluenediisocyanate or hexamethylenediisocyanate and diols, such as, for example, ethylene glycol or hexamethylene glycol may also be stabilized.

The polymers containing UV-absorbing groups of the invention are added to the plastics to be stabilized in an amount of from 0.05 to 10 percent by weight, calculated relative to the plastics.

A particularly good stabilization against UV-light is observed in the case of polycarbonates based on aromatic dihydroxy compounds, this being true both for transparent and for pigmented materials.

In the case of polycarbonates the polymeric UV-absorbers of the invention are also added in amounts of from 0.05 to 10 percent by weight, and preferably 0.1 to 2.5 percent by weight, calculated relative to the mixtures. The invention includes, therefore, polycarbonate molding compositions containing these amounts of stabilizer.

Suitable pigments for the polycarbonates are $TiO_2$, $BaSO_4$, CdS, $Cr_2O_3$ and iron oxides, which are employed in amounts of about 0.1 to 10 percent by weight, preferably 0.5 to 3 percent by weight, calculated relative to the mixture.

It is surprising that polycarbonate molding compositions pigmented with, for example, $TiO_2$, are also stable to UV-light. Under the influence of UV-light neither a molecular weight decrease (measured by the relative viscosity in methylene chloride at 20°C and a concentration of 5 g/liter nor a decrease in the mechanical properties is observed with the polycarbonates stabilized according to the invention.

The polycarbonates useful in the invention are those are obtainable by reaction of aromatic dihydroxy compounds with phosgene or bis-chlorocarbonic acid esters in accordance with the known process of interfacial polycondensation.

Examples of suitable aromatic dihydroxy compounds are: hydroquinone, resorcinol, 4,4'-dihydroxydiphenyl, bis-(hydroxyphenyl) -alkanes, -cycloalkanes, -sulphides, -ethers, -ketones, -sulphoxides or -sulphones, and also $\alpha,\alpha'$-bis-(hydroxyphenyl)-diisopropylbenzene as well as the corresponding nuclear-alkylated or nuclear-halogenated compounds. Polycarbonates based on 4,4'-dihydroxydiphenylpropane-2,2 (bisphenol A), tetrachlorobisphenol A, tetrabromobisphenol A, tetramethylbisphenol A and trinuclear bisphenols, such as $\alpha,\alpha'$-bis-(4-hydroxyphenyl)-p-diisopropylbenzene, are preferred.

Further bis-phenols suitable for the manufacture of the polycarbonates are described in U.S. Pat. Nos. 3,028,365; 2,999,835; 3,148,172; 3,271,368; 2,970,137; 2,991,273; 3,271,367; 3,280,078; 3,014,891 and 2,999,846.

If desired, fillers, such as glass fibers, as well as other stabilizers or additives may be added to the plastics stabilized with the compounds according to the invention, without thereby influencing or hindering the stabilizing action.

The polymeric UV-stabilizers according to the invention are incorporated into the plastics in accordance with known techniques, for example by:

1. Addition of the polymeric UV-absorber in bulk to the polymer melt;

2. Powdering or tumble-coating the polymeric UV-absorber onto the solid plastic (granules) with subsequent extrusion at the melt temperature;

3. Mixing the UV-absorbing polymers, in the powder form or in solution, with the pigment. In the latter case the solvent is evaporated off and the material is subsequently dried. The pigments treated in this way are then either applied to the solid plastic or directly incorporated into the melt;

4. Manufacture of plastics combinations with high contents of pigments and UV-absorbing polymers (master batch), followed by mixing these concentrates with unpigmented plastic.

Suitable apparatuses for incorporating the polymeric stabilizers into polycarbonates are, for example, kneaders and single-screw or twin-screw extruders.

The UV-stabilized molding compositions are employed wherever the moldings are exposed to weathering and/or an increased action of UV-light. Thus these moldings for example find use in the lighting field, as lamp covers, advertising lights or glazing, for external cladding, for casing components and for lacquerings of all kinds.

The subject of the invention is explained in more detail in the examples which follow, in which all parts and percentages are by weight unless otherwise specified.

In Examples A–F the monomeric alkenoyloxybenzylidenemalonic acid esters are manufactured as follows:

A. 101 g of methacrylic acid chloride and 250 cm$^3$ of methylene chloride are initially introduced into a stirred apparatus. A solution consisting of 229.5 g of 4-hydroxy-benzylidenemalonic acid diethyl ester, 90 g of triethylamine and 500 cm$^3$ of methylene chloride was added dropwise at room temperature over the course of 90 minutes and the reaction was completed by stirring for a further 2 hours. After extraction with 300 cm$^3$ of 4 percent strength NaOH, 300 cm$^3$ of 5 percent strength HCl and 300 cm$^3$ of H$_2$O, and after drying the organic phase and removing the solvent, the residue was recrystallized from 90 percent strength aqueous methanol.

Yield: 241 g (76 percent of theory) of the compound (V); colorless crystals; melting point: 41°C
Analysis: C$_{18}$H$_{20}$O$_6$ (by weight percent)
Calculated: C, 65.05; H, 6.07
Found: C, 65.00; H, 6.02

B. Following the process described under (A), 31.4 g of methacrylic acid chloride, 88.2 g of 3-methoxy-4-hydroxy-benzylidenemalonic diethyl ester and 30.4 g of triethylamine are reacted in 250 cm$^3$ of methylene chloride for 2 hours, and worked up.

Yield: 72 g (65 percent of theory) of the compound (VI); colorless crystals; melting point: 61 to 62°C
Analysis: C$_{19}$H$_{22}$O$_7$ (by weight percent)
Calculated: C, 62.97; H, 6.12
Found: C, 63.00; H, 6.05

The manufacture of the other monomers is effected in accordance with the process described under (A).

C. Charge: 4.2 g of methacrylic acid chloride, 13.0 g of p-hydroxybenzylidenemalonic acid di-n-octyl ester, 3.5 g of triethylamine and 35.0 cm$^3$ of methylene chloride.

Yield: 4.7 g (32 percent of theory) of the compound (VII); colorless oil
Analysis: C$_{30}$H$_{44}$O$_6$ (by weight percent)
Calculated: C, 71.97; H, 8.86
Found: C, 72.00; H, 8.84

D. Charge: 12.6 g of methacrylic acid chloride, 24.0 g of p-hydroxybenzylidenemalonic dimethyl ester, 12.5 g of triethylamine and 100.0 cm$^3$ of methylene chloride.

Yield: 17.6 g (58 percent of theory) of the compound (VIII); colorless crystals; melting point: 44°C.
Analysis: C$_{16}$H$_{16}$O$_6$ (by weight percent)
Calculated: C, 63.15; H, 5.30
Found: C, 63.00; H, 5.29

E. Charge: 5.5 g of acrylic acid chloride, 13.2 g of p-hydroxy-benzylidenemalonic diethyl ester, 6.0 g of triethylamine and 50.0 cm$^3$ of methylene chloride.

Yield: 12.7 g (80 percent of theory) of the compound (IX); colorless crystals; melting point: 50 to 51°C
Analysis: C$_{17}$H$_{18}$O$_6$ (by weight percent)
Calculated: C, 64.14; H, 5.70
Found: C, 64.10; H, 5.69

F. Charge: 3.7 g of acrylic acid chloride, 13.0 g of p-hydroxybenzylidenemalonic acid di-n-octyl ester, 3.5 g of triethylamine and 35.0 cm$^3$ of methylene chloride.

Yield: 8.5 g (58 percent of theory) of the compound (X); colorless oil
Analysis: C$_{29}$H$_{42}$O$_6$ (by weight percent)
Calculated: C, 71.57; H, 8.70
Found: C, 71.40; H, 8.77

EXAMPLES 1 (a to m)

(production of polymers of the invention)

25 g of the compound (V) are dissolved in 100 g of benzene and the solution is vigorously stirred while passing nitrogen over it. 0.25 g of azodiisobutyric acid nitrile are added and the mixture is slowly warmed to 80°C and the polymerization charge is kept at this temperature. In order to guarantee 100 percent conversion, a further 0.025 g of azodiisobutyric acid nitrile is added every 30 minutes. A conversion of 100 percent is achieved after about 6 hours.

The table which follows lists some polymers which are manufactured in accordance with the polymerization process described above.

| | Polymers of Monomers | Solvent | Molecular Weight ($M_w$) of the polymer obtained |
|---|---|---|---|
| a) | 100% of the compound V | benzene | 30,000 |
| b) | 30% of the compound V<br>70% of methyl methacrylate | chlorobenzene | 52,000 |
| c) | 40% of the compound V<br>60% of styrene | chlorobenzene | 60,000 |
| d) | 50% of methyl methacrylate<br>30% of the compound V<br>20% of glycidyl methacrylate | benzene | 48,000 |

-Continued

| | Polymers of Monomers | Solvent | Molecular Weight ($M_w$) of the polymer obtained |
|---|---|---|---|
| e) | 60% of the compound V<br>35% of styrene<br>5% of acrylonitrile | benzene | 38,000 |
| f) | 100% of the compound VI | dioxane | 40,000 |
| g) | 50% of the compound VII<br>50% of methyl methacrylate | chlorobenzene | 44,000 |
| h) | 40% of the compound VIII<br>30% of methyl methacrylate<br>30% of styrene | chlorobenzene | 39,000 |
| j) | 20% of the compound IX<br>70% of styrene<br>10% of acrylonitrile | benzene | 51,000 |
| k) | 30% of the compound VI<br>70% of methyl methacrylate | dioxane | 50,000 |
| l) | 100% of the compound X | dioxane | 38,000 |
| m) | 80% of the compound V<br>20% of hydroxypropyl methacrylate | benzene | 32,000 |

The following examples illustrate the stabilization of polycarbonate molding compositions according to the invention.

EXAMPLE 2

Manufacture of the polycarbonate

About 454 parts by weight of 4,4'-dihydroxydiphenyl-2,2-propane and 9.5 parts by weight of p-tert,-butylphenol are suspended in 1.5 liters of water. The oxygen is removed from the reaction mixture in a 3-neck flask equipped with a stirrer and gas inlet tube, while passing nitrogen through the reaction mixturre for 15 minutes, while stirring. 355 parts by weight of a 45 percent strength sodium hydroxide solution and 1,000 parts by weight of methylene chloride are then added. The mixture is cooled to 25°C. While maintaining this temperature by cooling, 237 parts by weight of phosgene are added over a period of 120 minutes. An additional amount of 75 parts by weight of a 45 percent strength sodium hydroxide solution is added after 15 to 30 minutes or after the absorption of phosgene has commenced. 1.6 parts by weight of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free of salt and of alkali. The polycarbonate is isolated from the washed solution and dried. The polycarbonate has a relative viscosity of 1.29 to 1.30, measured in an 0.5 percent strength solution of methylene chloride at 20°C. This corresponds approximately to a molecular weight of 32,000. The polycarbonate thus obtained is extruded and granulated.

EXAMPLE 3

Manufacture of a UV-stabilized, pigmented polycarbonate 2,940 g of polycarbonate based on bisphenol A, having a relative viscosity of $\eta_{rel}$ 1.3, are intimately mixed with 35 g of titanium dioxide and 15 g of the polymer (a) from Example 1 (polymer of p-methacryloxybenzylidenemalonic acid diethyl ester) and the mixture is dried at 110°C. Thereafter it is extruded by means of a twin-screw extruder at 320°C, The polymer ribbon is drawn off and granulated. The granules can be converted into test specimens in the usual manner on injection molding machines.

In the examples which follow, the procedure of Example 3 is utilized for the manufacture of the mixtures.

EXAMPLE 4

1,000 g of polycarbonate based on bisphenol A, having a relative viscosity $\eta_{rel} = 1.310$, are intimately mixed with 10 g of titanium dioxide and 8 g of a polymer of 3-methoxy-4-methacryloxybenzylidenemalonic acid diethyl ester (polymer 1f) and extruded at 330°C.

EXAMPLE 5

2,000 g of polycarbonate based on bisphenol A, having a relative viscosity $\eta_{rel} = 1.280$, are intimately mixed with 30 g of titanium dioxide and 10 g of a copolymer of 50 percent by weight of methyl methacrylate and 30 percent by weight of p-methacryloxybenzylidenemalonic acid diethyl ester and 20 percent by weight of glycidyl methacrylate (polymer 1d) and extruded at 300°C.

EXAMPLE 6

591 g of polycarbonate based on bisphenol A, having a relative viscosity of $\eta_{rel} = 1.280$, are intimately mixed with 6 g of titanium dioxide and 3 g of a copolymer of 70 percent by weight of styrene and 20 percent by weight of p-acryloxybenzylidenemalonic acid diethyl ester and 10 percent by weight of acrylonitrile (polymer 1j) and extruded at 290°C.

EXAMPLE 7

975 g of polycarbonate based on bisphenol A, having a relative viscosity of $\eta_{rel} = 1.280$, are intimately mixed with 15 g of titanium dioxide and 10 g of a copolymer of 70 percent by weight of methyl methacrylate and 30 percent by weight of 3-methoxy-4-methacryloxybenzylidenemalonic acid diethyl ester (polymer 1k) and extruded at 280°C.

EXAMPLE 8

1,950 g of polycarbonate based on bisphenol A, having a relative viscosity of $\eta_{rel} = 1.320$, are intimately mixed with 30 g of titanium dioxide and 20 g of a copolymer of 70 percent by weight of methyl methacrylate and 30 percent by weight of p-methacryloxybenzylidenemalonic acid diethyl ester (polymer 1b) and extruded at 310°C.

EXAMPLE 9

975 g of a polycarbonate from 94 mol percent of bisphenol A and 6 mol percent of tetrabromobisphenol A, having a relative viscosity of $\eta_{rel} = 1.280$, are intimately mixed with 15 g of titanium dioxide and 10 g of a polymer of p-methacryloxybenzylidenemalonic acid diethyl ester (polymer 1a) and extruded at 290°C.

EXAMPLE 10

2,970 g of a polycarbonate from 70 mol percent of bisphenol A and 30 mol percent of tetrachlorobisphenol A, having a relative viscosity of $\eta_{rel} = 1.330$, are intimately mixed with 15 g of titanium dioxide and 15 g of a copolymer of 70 percent by weight of methyl methacrylate and 30 percent by weight of p-methacryloxybenzylidenemalonic acid diethyl ester (polymer 1b) and extruded at 320°C.

EXAMPLE 11

1,970 g of a polycarbonate from 30 mol percent of bisphenol A and 70 mol percent of tetramethylbisphenol A, having a relative viscosity of $\eta_{rel} = 1.275$, are intimately mixed with 20 g of titanium dioxide and 10 g of a polymer of p-methacryloxybenzylidenemalonic acid diethyl ester (polymer 1a) and extruded at 280°C.

EXAMPLE 12

982 g of polycarbonate based on bisphenol A, having a relative viscosity of $\eta_{rel} = 1.295$, are intimately mixed with 10 g of titanium dioxide and 8 g of a polymer of p-acryloxybenzylidenemalonic acid di-n-octyl ester (polymer 1b) and extruded at 290°C.

EXAMPLE 13

1,949.6 g of polycarbonate based on bisphenol A, having a relative viscosity of $\eta_{rel} = 1.280$, are intimately mixed with 40 g of barium sulphate, 0.4 g of titanium dioxide and 10 g of a polymer of p-methacryloxybenzylidenemalonic acid diethyl ester (polymer 1a) and extruded at 310°C.

The light reflection before and after heat exposure, and some mechanical properties of the polycarbonate molding compositions stabilized against UV-light in accordance with the invention are listed in Tables II and III.

Table II

Light reflection before and after the heat exposure of the UV-stabilized pigmented polycarbonates

| PC composition[5] | Light reflection[1] in the initial state (420 nm) (percent) | Light reflection[2] after exposure to light (420 nm) (percent) | Light reflection[3] after heat exposure (420 nm) (percent) |
|---|---|---|---|
| PC from BPA, with 1.5% of TiO$_2$ [4] | 63 | 31 | 50 |
| PC from Example 3 | 74 | 50 | 70 |
| PC from Example 5 | 70 | 44 | 69 |
| PC from Example 7 | 70 | 42 | 66 |
| PC from Example 8 | 71 | 46 | 67 |
| PC from Example 9 but without use of the UV-light-absorbing polymer | 60 | 20 | 41 |
| PC from Example 9 | 72 | 40 | 63 |
| PC from BPA, with 1.0% of TiO$_2$ [4] | 62 | 32 | 50 |
| PC from Example 4 | 73 | 50 | 71 |
| PC from Example 6 | 68 | 45 | 60 |
| PC from Example 12 | 72 | 51 | 71 |
| PC from Example 11 but without use of the UV-light-absorbing polymer | 59 | 29 | 40 |
| PC from Example 11 | 70 | 46 | 67 |
| PC from Example 10, but without use of the UV-light-absorbing polymer | 58 | 24 | 43 |
| PC from Example 10 | 71 | 49 | 69 |
| PC analogous to Example 13 but without use of the UV-light-absorbing polymer | 48 | 30 | 35 |
| PC from Example 13 | 55 | 47 | 52 |

[1]Measured according to DIN 5,036 or 5,033 on 4 mm thick test specimens, backed with barium sulphate (420 nm=wave length of light/standard light C according to DIN 5033)
[2]The samples were exposed for 500 hours to a mercury vapor high pressure lamp of 250 watt from a distance of 8 cm.
[3]The samples were exposed to heat for 500 hours at 140°C.
[4]The blank samples were manufactured analogously to Example 3 but without using the polymer according to the invention.
[5]PC composition=polycarbonate composition.

Table III

Mechanical properties of the pigmented stabilized polycarbonates.

| PC composition[4] | $\eta$rel[1] dry | $\eta$rel[1] moist | Notched impact strength[2] dry | Notched impact strength[2] moist | Elongation at break, %[3] freshly injection-molded | Elongation at break, %[3] after heat exposure |
|---|---|---|---|---|---|---|
| PC from BPA | 1.280 | 1.278 | 51.1 | 38.3 | 125 | 108 |
| PC from BPA with 1.5% of TiO$_2$ [3] | 1.279 | 1.244 | 16.9 | 8.0 | 88 | 20 |
| PC from Example 3 | 1.280 | 1.277 | 27.7 | 25.5 | 112 | 60 |
| PC from Examle 5 | 1.279 | 1.280 | 25.0 | 24.8 | 70 | 40 |
| PC from Example 7 | 1.280 | 1.274 | 22.2 | 20.0 | 64 | 35 |
| PC from Example 8 | 1.280 | 1.276 | 15.5 | 12.3 | 83 | 30 |
| PC from Example 9 [3] | 1.279 | 1.240 | 12.0 | 6.0 | 70 | 20 |

Table III-Continued

Mechanical properties of the pigmented stabilized polycarbonates.

| PC composition[4] | $\eta$rel[1] dry | moist | Notched impact strength[2] dry | moist | Elongation at break, %[3] freshly injection-molded | after heat exposure |
|---|---|---|---|---|---|---|
| PC from Example 9 | 1.280 | 1.260 | 20.0 | 14.0 | 85 | 40 |
| PC from BPA with 1.0% of TiO$_2$ [3] | 1.280 | 1.256 | 20.0 | 12.0 | 100 | 35 |
| PC from Example 4 | 1.278 | 1.277 | 30.0 | 15.0 | 90 | 44 |
| PC from Example 6 | 1.278 | 1.260 | 22.0 | 12.0 | 90 | 40 |
| PC from Example 12 | 1.277 | 1.269 | 20.0 | 13.0 | 80 | 35 |
| PC from Example 11 [5] | 1.276 | 1.270 | 8.0 | 4.0 | 50 | 20 |
| PC from Example 11 | 1.278 | 1.270 | 12.0 | 10.0 | 80 | 38 |
| PC from Example 10 [5] | 1.276 | 1.270 | 16.0 | 13.0 | 70 | 28 |
| PC from Example 10 | 1.276 | 1.270 | 17.0 | 13.0 | 70 | 30 |
| PC from Example 13 [5] | 1.278 | 1.269 | 23.0 | 17.0 | 110 | 80 |
| PC from Example 13 | 1.279 | 1.274 | 26.0 | 20.0 | 100 | 90 |

[1]The relative viscosity measured in methylene chloride at 20°C and a concentration of 5 g/liter.
[2]Measured according to DIN 53,453/dimension: cmkp/cm$^2$
[3]Measured according to DIN 53,455
[4]PC composition=polycarbonate composition
[5]PC from the abovementioned example but without the use of a UV-light-absorbing polymer.

UV-stabilized transparent polycarbonate molding compositions:

EXAMPLE 14

100 parts by weight of the granulated polycarbonate manufactured according to Example 2 are intimately mixed with 0.5 part by weight of a polymer of p-methacryloxybenzylidene-malonic acid diethyl ester (polymer 1a) and extruded at 300°C and injection-molded to give test specimens.

Table IV shows the light transmission values of a UV-stabilized polycarbonate after exposure to light and after exposure to heat, in comparison to a non-stabilized sample.

Table IV

Light transmission values of a polycarbonate stabilized against UV-light, in comparison to an unstabilized sample

| | $\eta$rel[1] | Transmission[2] (420 nm) | Transmission[3] after heat exposure (420 nm) | Transmission[4] after exposure to UV (420 nm) | Transmission[5] Weather-o-meter (420 nm) |
|---|---|---|---|---|---|
| Polycarbonate from Example 2 | 1.294 | 81 | 72 | 63 | 62 |
| Stabilized polycarbonate from Example 14 | 1.290 | 79 | 76 | 71 | 70 |

[1]Measured in methylene chloride at 20°C. and a concentration of 5 g/liter;
[2]Measured according to DIN 5033;
[3]140°C in air over the course of 63 days;
[4]Mercury vapor high pressure lamp of 250 watt from a distance of 8 cm, for 500 hours;
[5]150 hours.

It is to be understood that any of the components and conditions mentioned as suitable can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Homopolymers of methacryloxybenzylidenemalonic esters.

2. Homopolymers condensed from alkenoyloxybenzylidenemalonic esters.

3. The homopolymers of claim 2 wherein the alkenoyloxybenzylidenemalonic esters have the formula

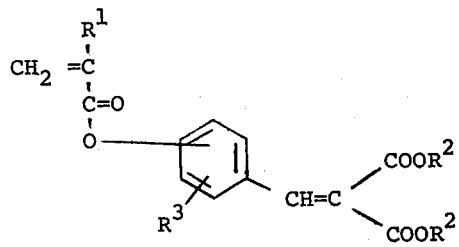

wherein
R$^1$ is hydrogen or alkyl with C$_1$ to C$_4$;
R$^2$ is alkyl with C$_1$ to C$_{12}$ or cycloalkyl; and
R$^3$ is hydrogen, alkyl with C$_1$ to C$_8$, alkoxy with C$_1$ to C$_8$ or halogen.

4. The homopolymers of claim 2 having a molecular weight of from 20,000 to 100,000.

5. The homopolymers of claim 2 having a molecular weight of from 30,000 to 60,000.

6. Polymers of ethylenically unsaturated monomers having UV-light-absorbing properties, characterized in that they contain alkenoyloxybenzylidenemalonic esters copolymerized in amounts of at least 5 percent by weight.

7. The polymers of claim 6 wherein the alkenoyloxybenzylidenemalonic esters have the formula

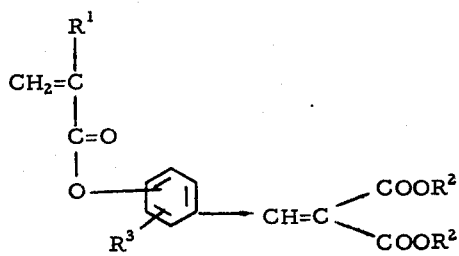

wherein
R¹ is hydrogen or alkyl with $C_1$ to $C_4$;
R² is alkyl with $C_1$ to $C_{12}$ or cycloalkyl; and
R³ is hydrogen, alkyl with $C_1$ to $C_8$, alkoxy with $C_1$ to $C_8$ or halogen.

8. The polymers of claim 7 wherein the alkenoyloxybenzylidenemalonic esters are copolymerized with ethylenically unsaturated monomers.

9. The polymers of claim 7 wherein:
R¹ is hydrogen or methyl;
R² is methyl, ethyl or n-octyl; and
R³ is hydrogen or methoxy.

10. The polymers of claim 8 wherein the ethylenically unsaturated monomers are vinyl monomers containing epoxide groups.

11. The polymers of claim 8 wherein the ethylenically unsaturated monomers are selected from the group consisting of: methyl methacrylate, styrene, glycidyl methacrylate, acrylonitrile, and hydroxy-propyl methacrylate.

12. The polymers of claim 6 having a molecular weight of from 20,000 to 100,000.

13. The polymers of claim 6 having a molecular weight of from 30,000 to 60,000.

14. Copolymers of methylmethacrylate and methacryloxybenzylidenemalonic diethyl ester.

* * * * *